United States Patent Office 3,428,995
Patented Feb. 25, 1969

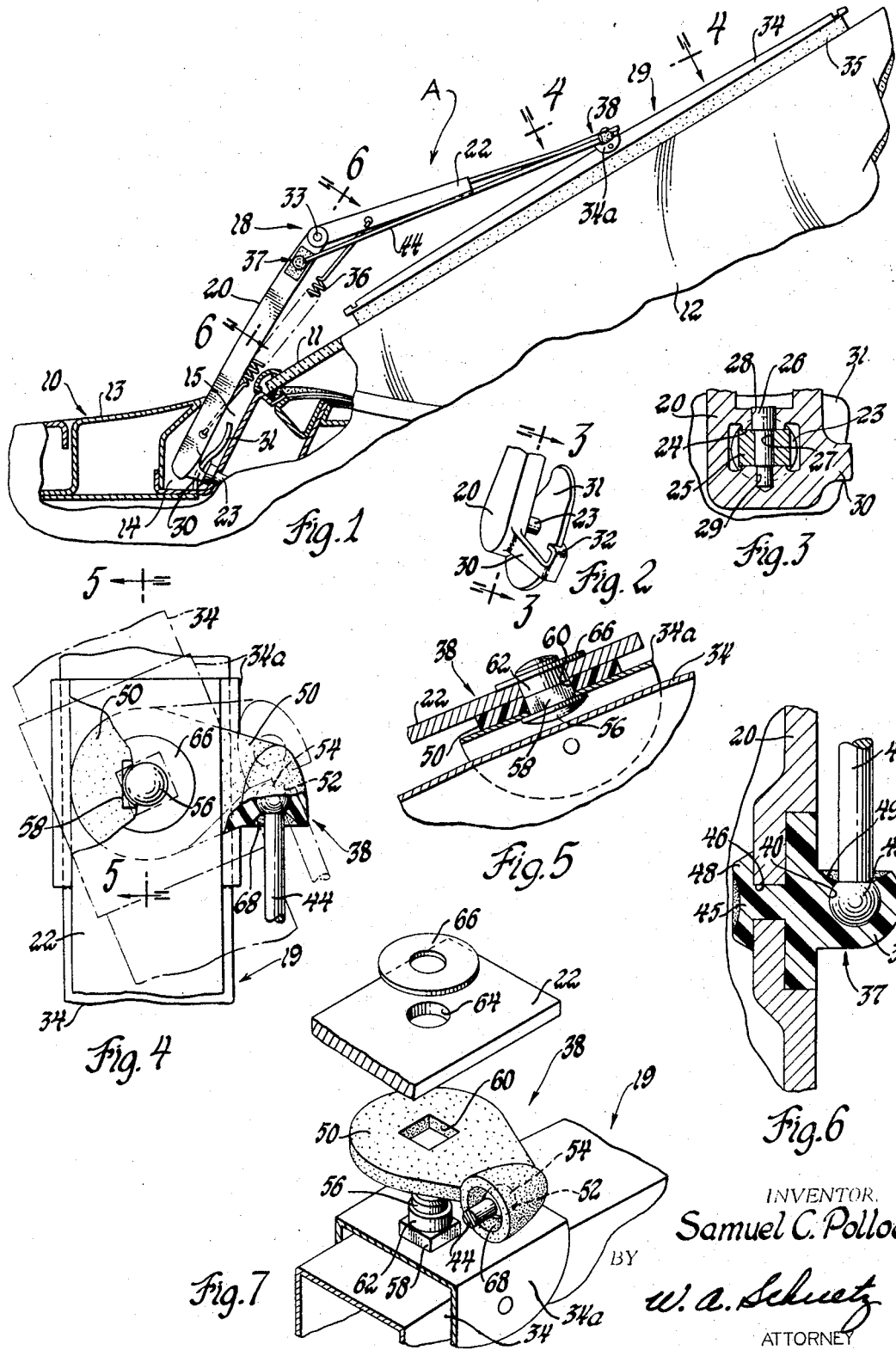

3,428,995
WIPER BLADE CONTROL LINK
Samuel C. Pollock, Rochester, Mich., assignor to General Motors Corporation, Detroit, Mich., a corporation of Delaware
Filed Nov. 8, 1967, Ser. No. 681,403
U.S. Cl. 15—250.23          4 Claims
Int. Cl. A47l 1/02; B60s 1/02

ABSTRACT OF THE DISCLOSURE

This disclosure relates to a praying mantis type windshield wiping mechanism having a wiper blade carried by a wiper arm structure which is pivoted about its longitudinal axis during its oscillatory movement to keep the wiper blade substantially perpendicular to the plane of the windshield. The wiper mechanism also includes an articulating means for moving the wiper blade relative to the wiper arm structure when the latter approaches the end of its outboard movement to increase the area wiped by the wiper blade.

---

The present invention relates to windshield wiping apparatus, and more particularly to a praying mantis type windshield wiper mechanism for cleaning wrap around windshields.

This invention is an improvement over the windshield wiper mechanism disclosed in United States Patent No. 3,213,478, assigned to the same assignee as the present invention. The windshield wiping mechanism shown in United States Patent No. 3,213,478 is characterized in the art as a praying mantis type due to its configuration. This type of wiper mechanism has an articulated wiper arm structure comprising a pair of pivotally connected wiper arm sections which are biased toward one another. The advantages of the articulated wiper arm structure are that the sections can be aligned with each other to enable the wiper arm to pass through a relatively narrow access opening in a well formed in the cowl structure of the vehicle to enable the wiper mechanism to be concealed when the wiper arms are moved to their parked position, and yet be angularly related to each other and with the wiper blade being maintained in pressure engagement with the windshield by the biasing means so as to effect cleaning of the windshield during the wiping operation In accordance with the provisions of the present invention, the windshield wiper mechanism disclosed in United States Patent No. 3,213,478 is improved primarily in two respects. One, the windshield wiper blade is maintained substantially perpendicular to the plane of the windshield at any given point in its travel thereacross and, two, greater areas of the windshield adjacent its opposite lateral edges are wiped.

Accordingly, it is an object of the present invention to provide a new and improved windshield wiper apparatus which allows the windshield wiping arm and blade to be concealed in a well when the wiping apparatus is not in operation, but which allows the wiper blade to articulate as well as remain substantially perpendicular to the windshield while wiping areas of abrupt curvature.

It is another object of the present invention to provide a new and improved windshield wiper apparatus which is utilizable with windshield wiping drive mechanisms in common use and which carries out the aforementioned objects.

It is still another object of the present invention to provide a new and improved windshield wiping apparatus in which the wiper arm is pivotable about its longitudinal axis and in which the wiper blade is pivotable about an axis extending transversely to the plane of the windshield so that greater and highly efficient wiping of a windshield having compound curvatures is effected.

It is yet another object of the present invention to provide a new and improved windshield wiping apparatus of the type referred to above and which is of a highly practical and economical construction and reliable in operation.

Further objects and advantages of the present invention will be apparent from the following detailed description with reference to the accompanying drawings in which the preferred embodiment of the present invention is illustrated.

In the drawings:

FIGURE 1 is a fragmentary side elevational view of a vehicle embodying the novel windshield wiping apparatus of the present invention and with certain parts thereof broken away;

FIGURE 2 is a fragmentary perspective view of part of the windshield wiping apparatus shown in FIGURE 1;

FIGURE 3 is an enlarged fragmentary sectional view taken approximately along line 3—3 of FIGURE 2;

FIGURE 4 is an enlarged fragmentary plan view of the subject mechanism and looking in the direction of the arrows 4—4 of FIGURE 1;

FIGURE 5 is a fragmentary sectional view taken approximately along line 5—5 of FIGURE 4; and FIGURE 6 is a fragmentary sectional view taken approximately along line 6—6 of FIGURE 1;

FIGURE 7 is an exploded perspective view of part of the windshield wiping apparatus shown in FIGURE 1.

FIGURE 1 of the drawings shows a windshield wiper mechanism A constructed in accordance with the provisions of the present invention mounted on an automotive vehicle 10. The vehicle 10 has a rearwardly inclined windshield 11 whose opposite lateral side portions (only one of which is shown) are sharply curved, as indicated by the reference numeral 12. The vehicle 10 also includes a forwardly extending cowl structure 13 having an elongated transversely extending well 14 therein, the well 14 being disposed forwardly and beneath the windshield 11. The well has an open access opening 15 of minimum width at its upper end and is adapted to contain the windshield wiper mechanism A when the latter is in its parked position so that the windshield wiper mechanism will be out of view when not in operation.

The novel windshield wiper mechanism A comprises a windshield wiper arm assembly or structure 18 and a wiper blade assembly 19 carried by the wiper arm assembly 18. The wiper arm assembly 18 comprises a pair of elongated wiper arm sections 20 and 22, hereinafter referred to as inner and outer wiper arm links, respectively. The inner wiper arm link 20 is drivingly connected at its lower end, as viewed in FIGURES 1 through 3, to an oscillatable drive pivot 23 suitably carried by the vehicle 10 and which projects into the well 14. The drive pivot 23 is adapted to be oscillated back and forth about its axis by any suitable or conventional drive mechanism, such as the drive mechanism disclosed in United States Patent No. 2,985,024. As shown in FIGURE 1, the windshield wiper mechanism A is located adjacent the lateral side portion 12 of the windshield 11. It should be understood that a second mechanism (not shown) of like construction is mounted adjacent the other lateral side portion of the windshield and operates in the same manner as the mechanism A.

The inner wiper arm link 20 is also supported by the drive pivot 23 for pivotal movement about its longitudinal axis. To this end, the wiper arm link 20 at its lower end has a transverse, generally rectangularly shaped opening 24 and the drive pivot 23 has a rectangularly shaped end portion 25 which is slidably received in the opening 24. As shown in FIGURE 3, the upper and lower sides of the end portion 25 of the drive pivot 23 are engageable with the upper and lower sides of the opening 24 and the left and right sides of the opening 24 are spaced from the adjacent lateral sides of the end portion 25 of the drive pivot 23 so that clearance for pivotal movement of the wiper arm link 20 relative to the drive pivot 23 is provided. The wiper arm link 20 is pivotally connected to the drive pivot 23 by a pivot pin 26. The pivot pin 26 is press fitted into a transverse opening 27 in the end portion 25 of the drive pivot 23 and is slidably received in aligned openings 28 and 29 in the wiper arm link 20.

From the foregoing, it should be apparent that oscillatable movement is imparted to the wiper arm link 20 due to the engagement between the upper and lower sides of the opening 24 and the upper and lower sides of the rectangularly shaped end portion 25 of the drive pivot 23, as viewed in FIGURE 3. It should also be apparent that the wiper arm link 20 is allowed to pivot about its longitudinal axis due to the provision of the pivot pin 26 and the clearance provided between the adjacent lateral sides of the opening 24 and the end portion 25 of the drive pivot 23.

Pivotal movement of the wiper arm assembly 18 about its longitudinal axis is controlled during the oscillatory movement imparted thereto by the drive pivot 23 so as to maintain the wiper blade assembly 19 substantially perpendicular to the plane of the windshield 11 during its movement thereacross. To this end, a cam follower 30 on the wiper arm link 20 and a stationary cam 31 having a contour which is a duplication of the contour of the windshield 11 is provided. The cam follower 30 is formed integral with the lower end of the wiper arm link 20 and has a bifurcated end 32 which slidably receives the outer periphery of the contoured cam 31. The cam 31 is suitably carried by the cowl structure 13. When the wiper arm assembly 18 is oscillated back and forth by the drive pivot 23, the cam follower 30 will follow the contour of the stationary cam 31 and causes the wiper arm link 20 to pivot about its longitudinal axis to maintain the wiper blade assembly 19 perpendicular to the plane of the windshield 11.

The outer wiper arm link 22 carries the wiper blade assembly 19 and is pivotally connected to the inner wiper arm link 20 by a pivot pin means 33 for movement relative to the inner wiper arm link 20 about an axis extending transversely of the axis of rotation of the drive pivot 23. The wiper blade assembly 19 comprises an elongated wiper blade support 34 and a rubber wiper blade 35 carried by the support 34 which engages the windshield 11. The wiper blade support 34 is pivotally connected to a U-shaped member 34a carried by the outer end of the wiper arm link 22 to enable the wiper blade assembly 19 to pivot about an axis parallel to the axis of the pivot pin 33.

As shown in FIGURE 1, the wiper arm link 22 and wiper blade assembly 19 are biased into engagement with the windshield 11 by a tension spring 36. The tension spring 36 has one end connected with the outer wiper arm link 22 and the other end connected with the inner wiper arm link 20. From the foregoing, it can be seen that the pivot pin means 33 enables the outer wiper arm link 22 to pivot relative to the inner wiper arm link 20 so that the spring 36 will maintain the wiper blade assembly 19 in pressure engagement with the windshield 11 as the former traverses the windshield.

It should be noted that the area wiped on the windshield by the wiper blade assembly 19 is not perfectly arcuate in shape but is generally elliptical in shape. This is due to the fact that, as the wiper blade assembly 19 approaches the end of its outboard movement, i.e. toward the lateral side portion 12, the windshield 11 drops off in contour rather abruptly causing the included angle between link 22 and link 20 to decrease. As this occurs, the effective length of the wiper arm assembly 18 decreases. On the other hand, when the wiper blade assembly 19 approaches the inboard extreme of its wiping pattern across windshield 11, the included angle between links 22 and 20 increases. As this occurs, the effective length of the wiper arm assembly 18 increases. The changing of the effective length of the wiper arm assembly 18 during its movement across the windshield causes the path that the wiper blade assembly 19 traverses to be generally elliptical in shape. Moreover, when the wiper arm assembly 18 is at its furthest inboard extreme of movement, links 20 and 22 are essentially straight so that the width of the access opening 15 of the wall 14 need not be very large to accommodate parking of the wiper mechanism in the well 14.

The subject windshield wiping mechanism also has an articulating means for moving the wiper blade assembly 19 relative to the wiper arm assembly 18 during its oscillatory movement across the windshield. Referring to FIGURE 4, the wiper blade assembly 19 is shown in two positions relative to the outer wiper arm link 22. In the solid line position, the blade assembly 19 and link 22 are in substantial alignment. This substantial alignment will be the relationship between the parts until wiper blade assembly 19 approaches the area 12 on the windshield 11 where an abrupt drop-off in the contour thereof is experienced. As this occurs, the angle between links 22 and 20 decreases sharply shortening the effective distance between ball joint and pivot 37 and ball joint and pivot 38 of the articulating means, as best seen in FIGURE 1, so that the latter causes the wiper blade assembly 19 to be moved toward the phantom line position shown in FIGURE 4 in which it is angularly related to the wiper arm link 22.

Referring to FIGURE 6, the ball joint and pivot assembly 37 is there shown as comprising essentially two parts, a resilient member 39 having a spherically shaped pocket 40 formed therein that is adapted to receive the ball or spherically shaped end 42 of articulating link 44. The member 39 is securely connected to the link 20 by forcing a flanged end portion 45 thereof through an aperture 46 in the wiper link 20 and with the flange 48 of the end portion 45 engaging the opposite side of the link 20. As shown in FIGURE 6, the entrance to the pocket 40 is tapered, as indicated by reference numeral 49, to enable the articulating link 44 to swivel or move relative to the member 39.

Referring to FIGURE 7, the U-shaped member 34a carrying the blade assembly 19 is shown as also carrying a resilient member 50 having a spherically shaped pocket 52 formed therein which is adapted to receive the ball or spherically shaped end 54 of articulating link 44. A post 56 is firmly attached to the members 34a and at its base has a square portion 58 which is disposed within a square shaped aperture 60 formed in the resilient member 50. Therefore, resilient member 50 is non-rotatable relative to the blade assembly 19. It should also be noted that, due to the reduced scale of FIGURE 1, member 50, ball end 54 and post 56 are referred to collectively as ball joint and pivot assembly 38. The post 56 has a cylindrical portion 62 which is disposed within an aperture 64 in the outer end of the outer wiper arm link 22. A snap washer 66 carried by the post 56 is provided to hold the link 22, member 50 and blade assembly 19 in assembled relation. It should also be noted that the entrance end of pocket 52 is tapered or flared, as indicated by reference numeral 68, to allow limited swivel movement of the articulating link 44 relative to member 50. FIGURE 5 shows the ball joint and pivot assembly 38 in assembled relation.

In operation, the subject mechanism is first moved from a parked position in the well 14 wherein links 20 and 22 and wiper blade assembly 19 are stowed out of view upwardly onto the lower edge of the windshield 11 and then oscillated back and forth across the windshield 11 between inboard and outboard positions. The windshield wiping mechanism is actuated by oscillating the drive pivot 23. The particular wiping mechanism described herein is adapted for use with a windshield wiping apparatus or system that has a parking capability. That is to say, the operative sweep of the wiper blades on the windshield has a shorter arc than the total distance from the outboard extreme of wipe to the stowed position in the well 14. Therefore, any well-known mechanism, such as shown in United States Patent 2,985,024, assigned to the same assignee as the present invention, is utilized to move the wiper blade assembly 19 past the normal inboard extreme of wipe on the windshield to a parked position in the well 14 when the wiper apparatus is de-energized. It is understood that it is considered to be within the purview of the present invention to utilize the subject mechanism in an arrangement where windshield 11 extends to the base of the well 14 and wherein the wiper blade assembly 19 would wipe during the normal wiping cycle without requiring any additional parking movement relative to the inboard extreme as noted above. This would mean that drive pivot 23 would pass through the lower end portion of the windshield which is located in the well 14.

Referring to FIGURE 1, when drive pivot 23 begins to rotate, the wiper blade assembly 19 is moved from the well 14 onto the windshield 11 and at this time links 20 and 22 are in a substantially straight line configuration. As the wiper blade moves toward its outboard extreme across the windshield 11, the effective length of wiper arm assembly 18 decreases because link 22 is held against windshield 14 and follows the contour thereof. This is due primarily to the slope of the windshield 11.

As wiper assembly 18 progressively drives the wiper blade across the windshield 11, the fall of the glass increases gradually until the wiper blade and arm assembly assume the position shown in FIGURE 1. When the drop-off of the contour of windshield 11 becomes more abrupt at its lateral side portion 12, the cam 31, which is contoured like the windshield 11, causes the link 20 to rotate about its longitudinal axis. The purpose of this is to maintain substantially perpendicularity between the wiper blade and the windshield 11 as the wiper blade travels across the windshield 11.

Additionally, as the lateral side portion of windshield 11 is progressively traversed, the angle between link 22 and link 20 is decreased, which causes the fixed length of articulating link 44 to rotate resilient member 50 carried by the link 22 from the solid line position shown in FIGURE 4 toward the phantom line position shown in FIGURE 4. Therefore, the wiper blade will be articulated so as to extend generally vertically as it wipes the side portion 12. As this occurs, cooperation of cam 31 and cam follower 30 will maintain substantial perpendicularity of blade 35 relative to windshield 11 even though an abrupt fall off in the contour of windshield 11 is being experienced. The return cycle of the wiper blade 35 from an outboard extreme of movement will merely reverse the pivoting actions just described and, thus, the wiper arm assembly 18 will assume the configuration it had at the position of the beginning of the wipe pattern. Parking the wiper arm assembly 18 in the well 14 is accomplished in any well-known fashion by use of the mechanism such as described in United States Patent 2,985,024.

The subject invention therefore allows the wiping of a compound curved windshield in a very efficient manner while maintaining the blade substantially perpendicular relative to the plane of the windshield 11 throughout the wiping pattern. In addition, relatively even blade pressure on the windshield 11 is maintained even as blade 35 articulates into the side portion 12, which portion is a rather difficult zone on the windshield to be cleaned. Additionally, by articulating the blade 35 to a generally vertical position as it wipes the side portion 12, an increased area of the windshield is wiped as opposed to using wiper systems in which the blade is maintained in alignment with the wiper arm structure. All of the foregoing is accomplished while allowing the windshield wiping system described herein to be of the slot concealed variety which is a particularly desirable feature both from the aesthetic standpoint and from the standpoint of keeping the area covered by the windshield completely unobscured while the wipers are not in operation.

While the embodiment of the present invention, as herein disclosed constitutes a preferred form, it is to be understood that other forms might be adopted.

What is claimed is:

1. A windshield wiper mechanism for cleaning a rearwardly inclined windshield of a vehicle comprising at least one wiper arm means having first and second elongated sections, means for pivotally supporting said first section for oscillatory movement through a predetermined arcuate path in a plane substantially parallel to the plane of the windshield and for pivotal movement about its longitudinal axis, said second section being pivotally connected to said first section by a pivot means for pivotal movement about an axis extending transversely of said longitudinal axis, biasing means operatively connected with said first and second sections for biasing said second section toward the windshield, a wiper blade assembly pivotally supported by said second section for rotation about an axis extending transversely of the windshield, and a link operatively connected with said first section of said wiper arm means and said wiper blade assembly to control pivotal movement of said wiper arm assembly relative to said second section during a portion of the path of movement of said first section of said wiper arm means.

2. In a vehicle having a slot in an outer covering extending transversely of the vehicle and located forwardly of a rearwardly extending, curved windshield; a windshield wiping mechanism for cleaning the windshield comprising a drive pivot extending into said slot and which is adapted to be oscillated by a drive means, a wiper arm means having first and second elongated sections, means for drivingly connecting said first section to said drive pivot and for pivotally connecting said first section to said drive pivot for rotational movement about its longitudinal axis, said second section being pivotally connected to said first section by a pivot means for pivotal movement about an axis extending transversely of said longitudinal axis, spring means operatively connected with said first and second sections for biasing said second section toward the windshield, stationary cam means carried by said vehicle, said first wiper arm section having a cam follower in operative engagement with said cam means, sam cam means effecting movement of said first wiper arm section about its longitudinal axis when it is oscillated by said drive pivot, a wiper blade supported by said second section for pivotal movement about an axis extending transversely of the plane of the windshield, and an articulating link means operatively connected with said first wiper arm section and said wiper blade and effecting movement of said wiper blade about its pivotal axis when said first wiper arm section is approaching an extreme of its path of movement.

3. In a vehicle according to claim 2 wherein said first wiper arm section has a limited movement ball joint carried on a portion thereof and said wiper blade assembly has a limited movement ball joint carried on a portion thereof in substantial alignment with said first mentioned ball joint, said articulating link having balls at its opposite ends thereof engaging said ball joints to accommodate a limited amount of rotation of said first wiper arm link about its longitudinal axis to allow said wiper blade assembly to be maintained substantially perpendicular to the windshield as said first wiper arm section is rotated about its own longitudinal axis near an extreme of movement across the windshield.

4. In a vehicle according to claim 3 wherein said ball joints are resilient and have an opening therein which is smaller in diameter than the balls at the ends of said articulating link and wherein said balls are forced into said ball joints and resiliently held therein during operation of the windshield wiping mechanism.

References Cited

UNITED STATES PATENTS

| | | | |
|---|---|---|---|
| 2,012,313 | 8/1935 | Lark et al. | 15—250.23 |
| 2,533,963 | 12/1950 | Sacchini | 15—250.21 |
| 3,012,266 | 12/1961 | Riester et al. | 15—250.21 |
| 3,044,095 | 7/1962 | Deibel et al. | 15—250.42 |
| 3,213,478 | 10/1965 | Pollock | 15—250.16 |

FOREIGN PATENTS 1,056,950   5/1959   Germany.

PETER FELDMAN, *Primary Examiner.*

U.S. Cl. X.R.

15—250.21, 250.34, 250.35